Oct. 27, 1931. R. F. YATES Re. 18,239

ELECTRODYNAMICALLY CONTROLLED FIGURE

Original Filed June 10, 1925 2 Sheets-Sheet 1

INVENTOR
R. F. Yates
BY Ezekiel Wolf
ATTORNEY

Oct. 27, 1931. R. F. YATES Re. 18,239

ELECTRODYNAMICALLY CONTROLLED FIGURE

Original Filed June 10, 1925 2 Sheets-Sheet 2

INVENTOR
R. F. Yates
BY Eyllil Wolf
ATTORNEY

Reissued Oct. 27, 1931

Re. 18,239

UNITED STATES PATENT OFFICE

RAYMOND FRANCIS YATES, OF BUFFALO, NEW YORK, ASSIGNOR, BY MESNE ASSIGNMENTS, TO TOBE DEUTSCHMANN, TRUSTEE

ELECTRODYNAMICALLY-CONTROLLED FIGURE

Original No. 1,726,283, dated August 27, 1929, Serial No. 36,207, filed June 10, 1925. Application for reissue filed August 26, 1931. Serial No. 559,580.

This invention relates to electrodynamically controlled figures and particularly to a dancing figure toy, or the like, used in advertising or for amusement or the like.

An object of the invention resides in providing a figure with which is connected suitable apparatus for electrical operation for setting the figure in motion, in response to the undulating or varying electric currents received in the apparatus which may result from voice or music being impressed upon the current flowing in the circuit to the apparatus.

Another object of the invention resides in providing a figure movably supported or having movable portions connected to suitable apparatus operated by the modulated current flowing in a circuit receiving signals or sounds, in order that the figure will be operated in accordance with the variations in the flow of the current in the circuit, resulting from the transmission and reception of the signals or sounds.

The invention is more fully and completely set forth in the accompanying drawings, and in the following detailed description and claims, directed to a preferred form of the invention, it being understood, however, that numerous variations in the practical embodiments of the invention may be made, without departing from the principle or scope of the invention as set forth therein.

In the drawings, forming a part of this application:

Figure 1:
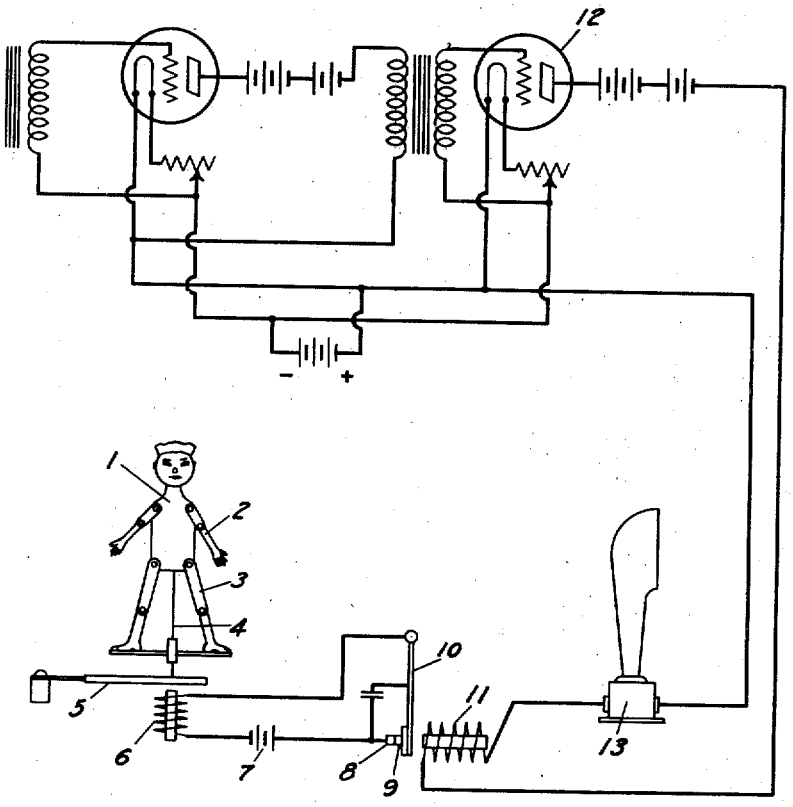
Figure 1 is a diagrammatic view showing principally the wiring diagram for a sound receiving and amplifying circuit adapted to operate the figure.

Referring particularly to Figure 1, a figure, such as a dancing figure or the like, is indicated at 1, which may have movable arms and legs 2 and 3 respectively, or other movable portions, according to the character of figure used. A connection is made, as indicated at 4, between the figure and a suitable vibrating or movable member 5, which may be in the form of an armature for an electro-magnet, as illustrated or of any other desired form or character, suitable in operation to produce movement of the figure for causing the figure to dance or in any other manner produce movements of the various movable parts thereof. An electro-magnet is indicated at 6, for operating the movable member 5, which, as illustrated, forms the armature of the electromagnet, while the terminals of said electromagnet are connected in an independent circuit with the source of energy 7, and the stationary and movable contacts 8 and 9 respectively, which are alternately engaged and disengaged through the movement of the movable contact 9 carried by the armature 10.

For this purpose, the stationary and movable contacts 8 and 9 and the armature 10 carrying the movable contact is provided to be suitably operated by the electromagnet 11, having the opposite terminals connected to the output circuit of an electron operated device 12, forming part of a suitable sound or signal amplifying unit. A suitable sound reproducing device may be included in the output circuit with the electromagnet 11, such as indicated at 13, which may be of any desired form or structure for reproducing the sound transmitted or received in the output circuit of the amplifying unit.

Figure 1 illustrates essentially the diagrammatic view of the wiring connection for a suitable receiver for amplifying and reproducing signals and sounds carried by a music or voice modulated current of irregular character, and it is to be understood that the circuit transmitting said signals or currents might well be used as a receiver circuit for controlling and operating the electromagnet 11 adapted to reproduce the essential variations through the operation of the armature 10, in the circuit including the electromagnet 6, for operating the movable member 5 to mechanically reproduce by vibration the variations or moduations of the received currents and operate the figure 1 to move in accordance therewith. In this way, it will be seen that the figure will be operated to move or dance in accordance with the variations of current in the output circuit of the amplifying unit. The same results would be obtained by including the electromagnet 11 in the output circuit or some other portion of the circuit of a sound amplifying device.

Figure 5:
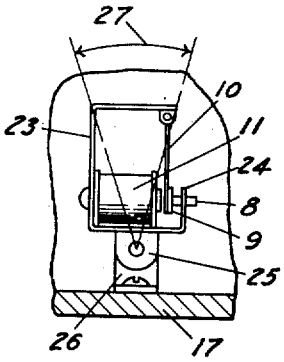
Figure 5 is a sectional view, taken on the line 5—5 of Figure 3.
Figure 2:
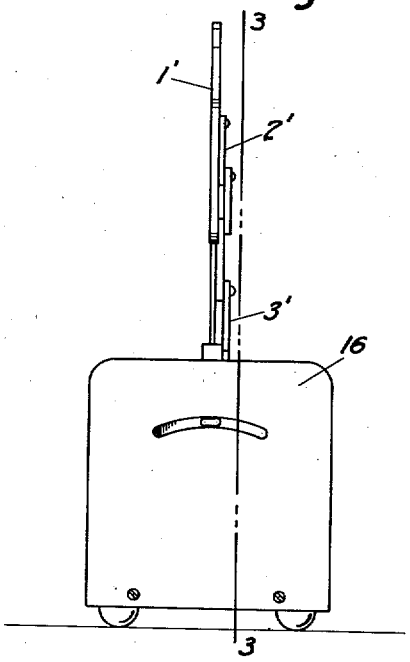
Figure 2 is a side elevation of a structure mounting the figure and containing the apparatus for receiving the electrical impulses to operate the same.
Figure 3:
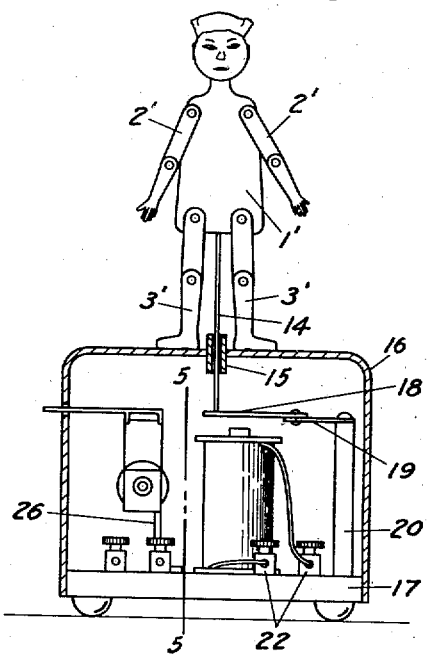
Figure 3 is a sectional view, taken on the line 3—3 of Figure 2.

Figures 2, 3, and 5 illustrate particularly a mechanical embodiment of the idea heretofore described, in which the figure 1′ has movable arms 2′ and movable legs 3′ formed of jointed sections pivotally connected together and to the body of the figure. The body of the figure is supported on the rod 14 slidably fitted in the sleeve 15 carried by the housing 16 suitably connected to the base 17. The lower end of the rod 14 is rested on the armature 18, resiliently supported through the spring strip 19 on the post 20, carried by the base 17. Suitable electromagnet 21 is mounted on the base 17, with the pole piece positioned for actuating the armature 18 upon energization of the electromagnet, the terminals being connected in series with contacts 8 and 9 associated with armature 10, (Figure 5) and binding posts 22, so that the same may be interposed in circuit, as illustrated in Figure 1. It will be seen that by connecting the electromagnet 11, (Figure 5) in a circuit and impressing modulated or varying currents thereon, that the armature 18 will be operated to produce a movement of the figure, the vibration of which will cause the legs and arms to move on their pivoted joints, in accordance with the vibration of the armature 18, resulting from the current interruptions in the circuit containing the electromagnet 21.

Figure 4:
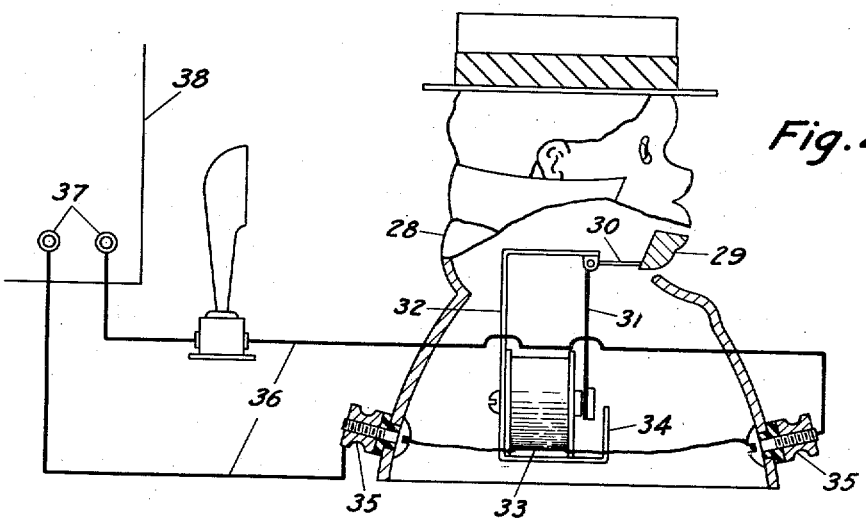
Figure 4 is a side elevation, showing portions in section, of a slightly different and simplified form of figure, utilizing the same principle of operation as in the above illustrated structure for operating a portion of the figure.

In Figures 3 and 5 a substantially sensitive relay construction is illustrated, showing a practical embodiment of the electromagnet 11, armature 10, and stationary and movable contacts 8 and 9 respectively. A suitable frame is provided at 23 which supports the electromagnet 11 in the bottom portion thereof, and carries the stationary contact 8 in the upturn end 24, while the opposite end extends laterally and pivotally mounts for suspended swinging movement the armature 10. This armature normally maintains a vertical position by gravity, in suspension from the bracket 23, and is moved through the energization of the electromagnet 11, in accordance with current pulsations or variations, in the circuit in which the electro-magnet is connected. The lower side of the bracket carries a depending extension 25, which is pivotally connected with the bracket 26, carried by the base 17, so that the magnet and armature may be adjusted relative to the vertical to vary the position of the armature 10, under the action of gravity, between limits, such as indicated by the numeral 27, in order that the sensitiveness and distance that the armature is required to move to engage the stationary contact may be varied within desired limits.

Where it is desired to operate the figure directly from the output circuit of the amplifying unit, it has been found preferable to use a relay, similar to that illustrated in Figure 5, but minus the contacts, for directly operating the movable portions of the figure, such as is illustrated in the construction shown in Figure 4. In this figure of the drawings, a suitable form of figure structure is illustrated at 28, having a movable portion 29 which is directly mounted on the lateral projecting arm 30 of the suspended armature 31. The lateral projection of the bracket member 32 forms a pivotal suspending element or mounting for the armature 31, the lower end of which extends into proximity with one end of the relay coil 33 mounted in the bracket member, while the upturn end 34 of the bracket member limits the stroke of movement of the armature. The relay magnet is connected to suitable terminals 35 mounted on the body of the figure 28, with which are connected the wires 36 connected with the terminals 37 of the output circuit of a suitable amplifying unit 38. In operation, the fluctuation or variation due to varying the sound intensities impressed upon the current in the circuit including the relay 33 will move the armature 31 and correspondingly the movable part 29 of the figure, which will reproduce the current fluctuations and modulations in the output circuit of the amplifying unit.

From the above description, it should be understood that an electro-dynamically operated figure is produced which will be operated in accordance with the variations of current in the output circuit of a suitable electrical apparatus, which receives or transmits sounds or other forms of energy by the variations or oscillation of an electric current flowing in suitable circuits and apparatus which may include the modulated currents in radio or telephone circuits, so that the figure will mechanically reproduce these variations.

It is to be understood that this invention may be applied in many ways in connection with the production of advertising and amusement devices as well as toys adapted for general use, and that the structure of the elements for reproducing the electrical variations in mechanical movement may be of any desired character of which the forms shown serve as illustrations.

What is claimed is:

1. In a device of the class described, a toy figure, and means for agitating said figure in direct response to the variations of an electric current varying at audio frequencies, said means comprising a vibratile armature mechanically connected to said figure, an electro-magnet associated with said armature, and means for electrically connecting said electromagnet with a source of variant currents of audio frequency.

2. In combination, a toy figure, and means for agitating said figure, said means comprising a radio-receiving set constructed and arranged to produce audio frequency electric currents in response to electromagetic waves, an electromagnetic device operatively connected with said receiving set, and means actuated by said electromagnetic device for agitating said figure in response to audio frequency currents received from said set.

3. In a device of the class described, a toy figure having loosely attached limbs, a support for said figure comprising a pivotally mounted armature, means connecting the figure with said support, and means directly responsive to variations in radio waves for vibrating said support, said vibrating means comprising an electromagnet and radio-receiving apparatus capable of sending variant electric currents through the coil of said electromagnet in response to variations in radio waves received thereby.

4. In a device of the class described, a radio-receiving set comprising apparatus for setting up oscillatory currents in response to radio waves and delivering corresponding currents varying at audio frequencies, in combination with an electromagnet having a flux variable by said variant current and a vibratile armature response to said variations of flux, a toy figure, and a support for said figure mechanically connected with said armature, whereby toy and support are vibrated by said armature.

5. A device of the class described comprising in combination, a toy figure, means for agitating said figure in direct response to the variations of an electric current varying at audio frequencies, means for converting radiant energy into variant electric currents of audio frequencies, and means for operatively connecting said agitating means with said converting means.

6. A device of the class described comprising in combination, a toy figure, means for agitating said figure in direct response to the variations of an electric current varying at audio frequencies, said means comprising a supporting member for said figure, a vibratile armature connected thereto, and an electromagnet associated with said armature; means for converting radiant energy into variant electric currents and means for operatively connecting said electromagnet with said converting means.

7. In a device of the class described, a toy figure and means for agitating said figure in direct response to the variations of an electric current, varying at audio frequencies, said means comprising a vibratable means operably supporting said figure, electromagnetic means including in part said vibratable means for operating the latter, and means for electrically connecting said electromagnet with a source of variant current of audio frequency.

8. In a device of the class described, a toy figure having loosely attached limbs and means for agitating said figure comprising means electrically operated for producing mechanical vibrations corresponding to variant currents of audio frequency and means operatively connecting said electrically operated means to said figure.

9. In a device of the class described, a toy figure and means for agitating said figure in direct response to variations of an electric current varying at audio frequencies, said means comprising a vibratable element operably supporting said figure and electrical means operating at audio frequency current variations for operating the vibratable element.

10. In a device of the class described, a toy figure and means for agitating said figure rhythmically in response to varying electrical currents whose characteristics may be the same as speech, music and phonetic vibrations comprising an audio frequency amplifying unit and an electromagnetic unit having a vibratable element operatively connected thereto, and means operatively connecting said vibratable element to said toy figure.

11. In a device of the class described, a toy figure and means for agitating said figure rhythmically in response to varying electrical currents whose characteristics may be the same as speech, music and phonetic vibrations comprising an electromagnetic unit having a vibratable element and means operatively connecting said vibratable element to said toy figure.

RAYMOND FRANCIS YATES.